United States Patent
Huang et al.

(10) Patent No.: US 12,118,653 B2
(45) Date of Patent: Oct. 15, 2024

(54) DEPTH ANALYZER AND SHADING RATE CONTROLLER

(71) Applicant: MediaTek Inc., Hsinchu (TW)

(72) Inventors: Po-Yu Huang, Hsinchu (TW); Shih-Chin Lin, Hsinchu (TW); Jen-Jung Cheng, Hsinchu (TW); Tu-Hsiu Lee, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 17/944,415

(22) Filed: Sep. 14, 2022

(65) Prior Publication Data

US 2024/0087207 A1    Mar. 14, 2024

Related U.S. Application Data

(60) Provisional application No. 63/328,760, filed on Apr. 8, 2022.

(51) Int. Cl.
*G06T 15/00* (2011.01)
*G06T 1/20* (2006.01)
*G06T 7/50* (2017.01)

(52) U.S. Cl.
CPC ............ *G06T 15/005* (2013.01); *G06T 1/20* (2013.01); *G06T 7/50* (2017.01)

(58) Field of Classification Search
CPC ....... G06T 15/005; G06T 15/00; G06T 15/08; G06T 15/60; G06T 15/80; G06T 15/83; G06T 15/87; G06T 1/20; G06T 7/50; G06T 11/40
See application file for complete search history.

(56) References Cited

U.S. PATENT DOCUMENTS

| | | | |
|---|---|---|---|
| 10,591,971 B2 * | 3/2020 | Schluessler | G06F 9/5083 |
| 10,930,022 B2 * | 2/2021 | Yang | G06T 15/06 |
| 11,308,658 B2 * | 4/2022 | Yang | G06T 13/20 |
| 11,455,770 B2 * | 9/2022 | Guo | G06T 1/20 |

(Continued)

FOREIGN PATENT DOCUMENTS

| | | |
|---|---|---|
| CN | 110868580 A | 3/2020 |
| CN | 112614041 A | 4/2021 |
| TW | 201909109 A | 3/2019 |

*Primary Examiner* — Vijay Shankar
(74) *Attorney, Agent, or Firm* — Sterne, Kessler, Goldstein & Fox P.L.L.C.

(57) ABSTRACT

A system, method, and computer program product are provided for reducing GPU load by programmatically controlling shading rates in computer graphics. GPU load may be reduced by applying different shading rates to different screen regions. By reading the depth buffer of previous frames and performing image processing, thresholds may be calculated that control the shading rates. The approach may be run on any platform that supports VRS hardware and primitive- or image-based VRS. The approach may be applied on a graphics driver installed on a client device, in a firmware layer between hardware and a driver, in a software layer between a driver and an application, or in hardware on the client device. The approach is flexible and adaptable and calculates and sets the variable rate shading based on the graphics generated by an application without requiring the application developer to manually set variable rate shading.

20 Claims, 9 Drawing Sheets

(56) References Cited

U.S. PATENT DOCUMENTS

| | | | |
|---|---|---|---|
| 11,650,658 B2* | 5/2023 | Babu | G06T 1/20 |
| | | | 345/156 |
| 2020/0051290 A1* | 2/2020 | Yang | G06T 5/003 |
| 2020/0301503 A1* | 9/2020 | Babu | G06F 3/012 |
| 2021/0027541 A1 | 1/2021 | Chao et al. | |

* cited by examiner

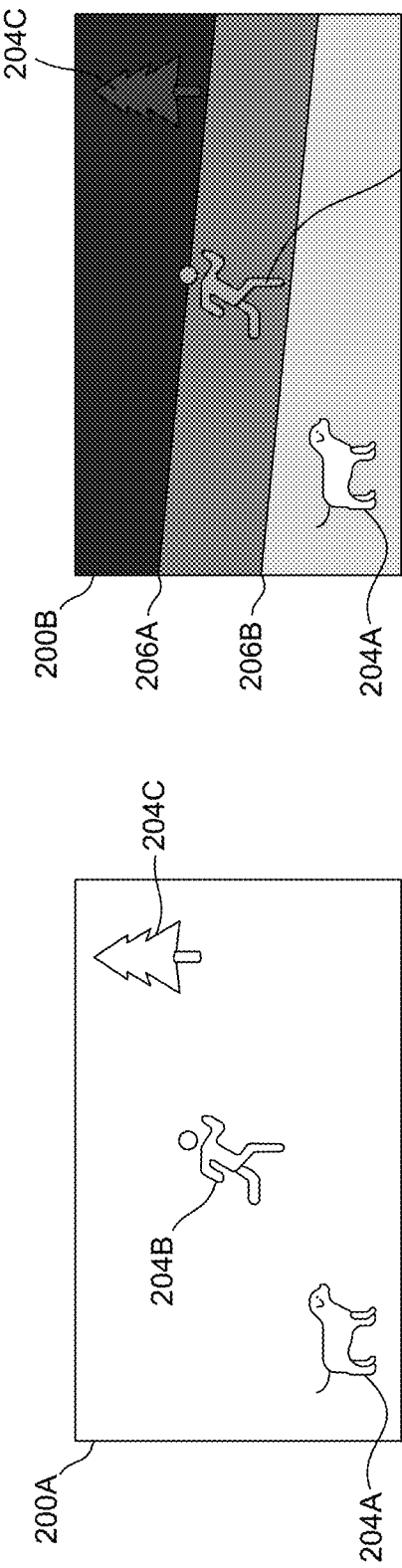
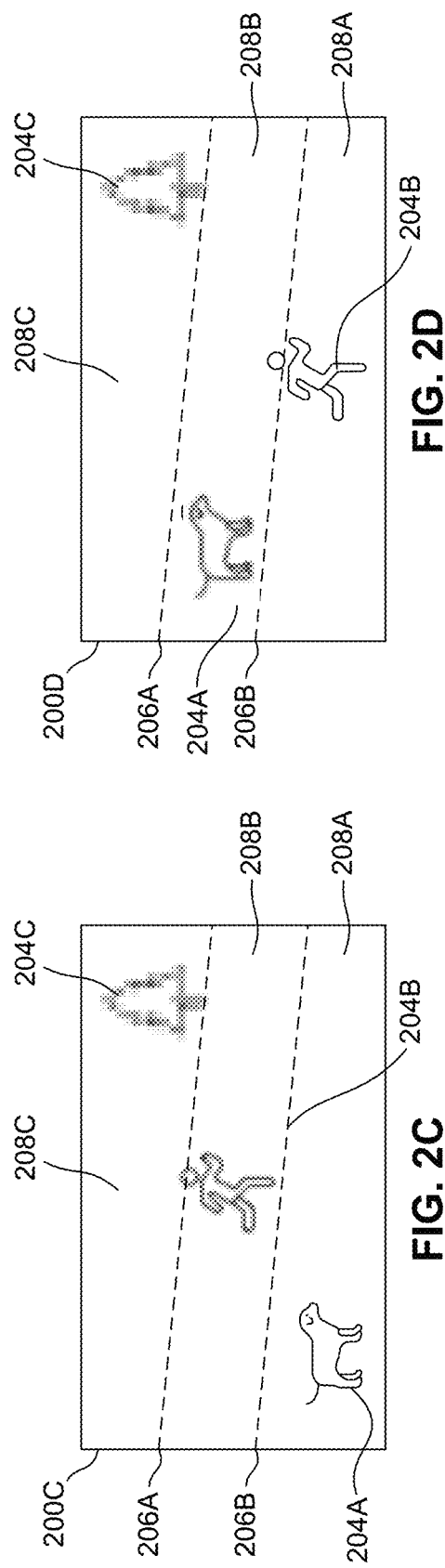

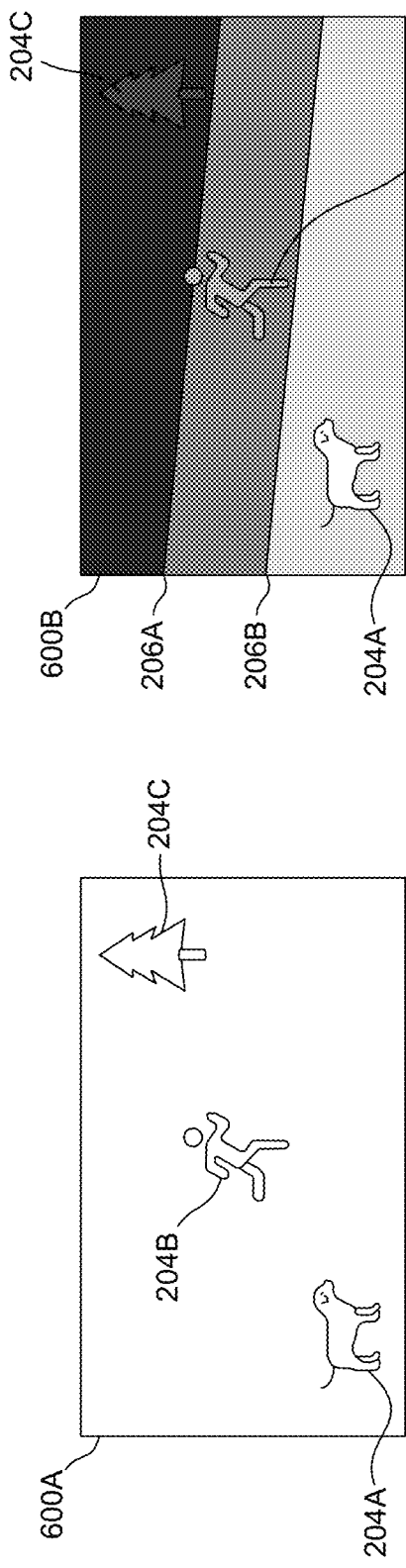
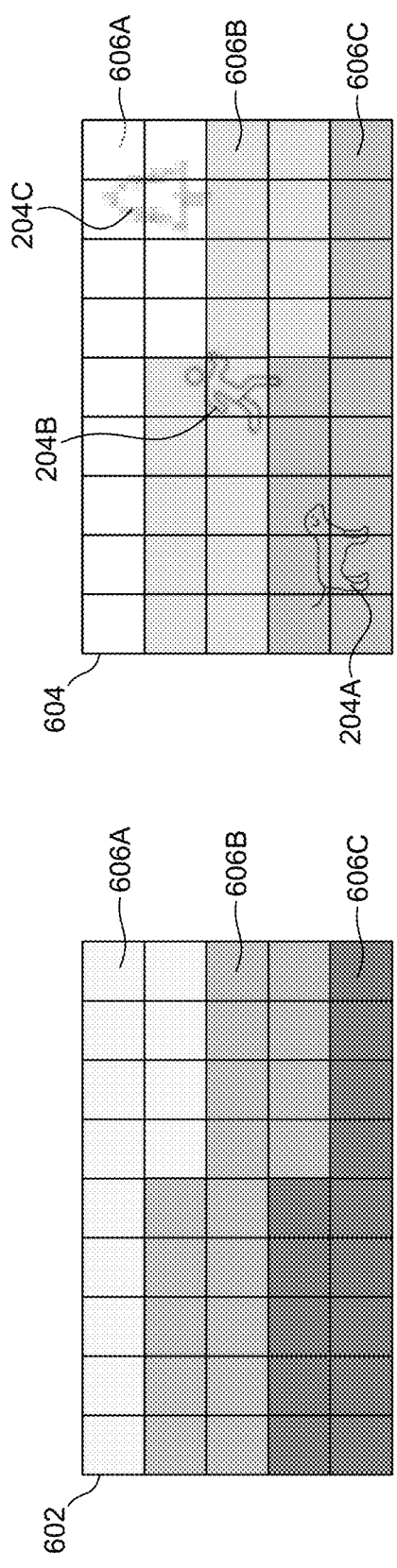
FIG. 6A
FIG. 6B
FIG. 6C
FIG. 6D

DEPTH ANALYZER AND SHADING RATE CONTROLLER

BACKGROUND

Computer graphics are a foundational element of software applications. Graphics are virtual visualizations such as images, videos, and other representations of real or imaginary objects. A wide-array of software applications employ computer graphics as part of their functions. Such applications include games, movies, multimedia/content delivery systems, social media tools, design products, word processors, spreadsheets, navigation systems, mobile applications, and many other software tools.

Computer graphics have evolved to become increasingly rich, lavish, and complex. Realistic, 3-D graphics are now commonplace. Resolution and frame rates have expanded to support the detailed, life-like, and immersive graphics. However, processing these complicated graphical tapestries requires significant computing resources (e.g., CPU, memory, etc.). Graphics processing unit ("GPU") circuitry and other specialized hardware have been designed to perform specific tasks related to rendering graphics.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 2A-2D are example screen displays that illustrate a general application of variable rate shading to objects in a scene, according to some embodiments.

FIGS. 6A-6D are example screen displays that illustrate the use of a variable rate shading lookup image to control the shading rates in a frame, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
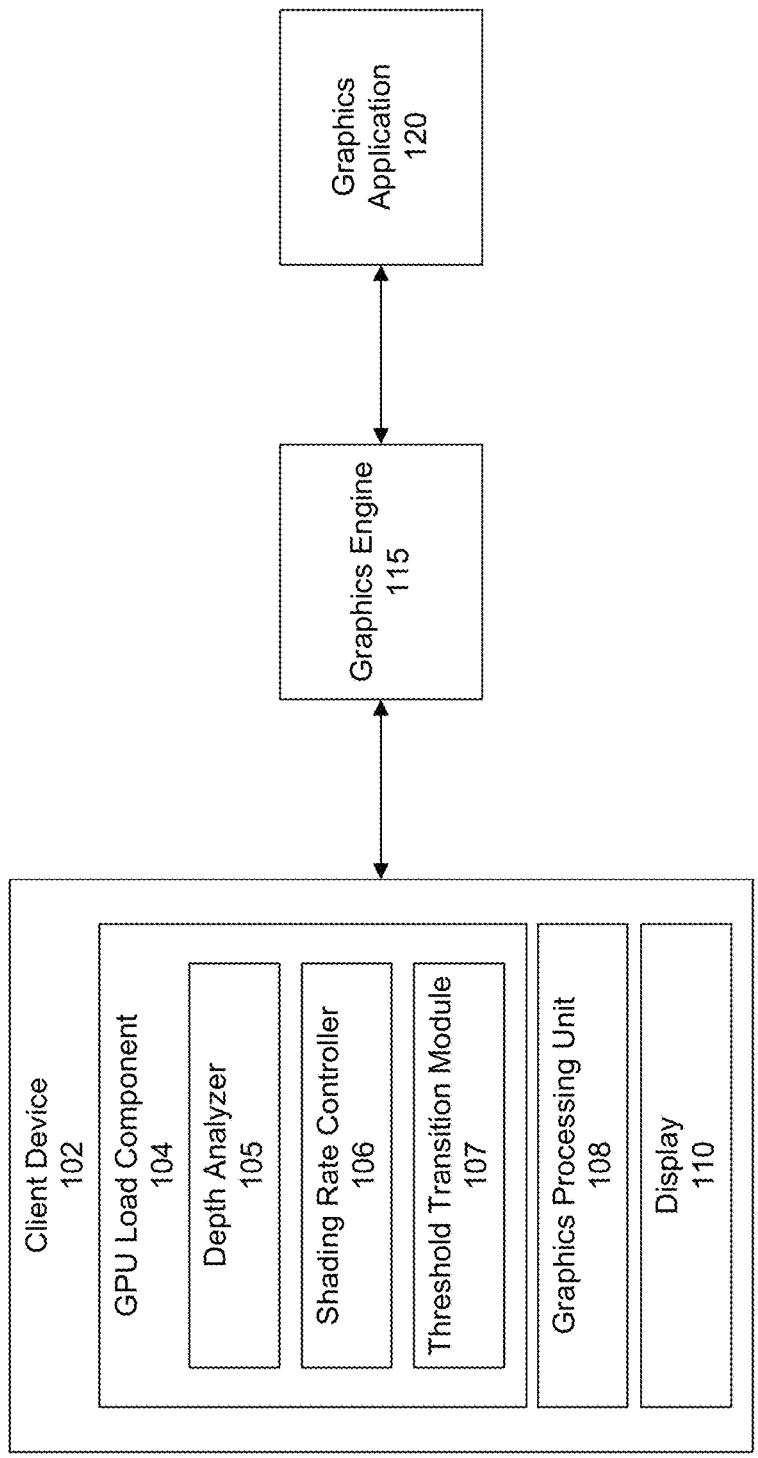
FIG. 1 is a block diagram of an environment including a client device that reduces GPU loading by applying variable rate shading to graphics generated by a graphics application, according to some embodiments.

Provided herein are system, apparatus, device, method and/or computer program product embodiments, and/or combinations and sub-combinations thereof, for reducing graphics processing unit ("GPU") load by programmatically controlling shading rates in graphics.

Generally speaking, software applications present visualizations in the form of computer graphics. For example, in a computer game, graphics may immerse a player in a virtual world that is a 3-D space composed of virtual objects. The player may move around and interact with the virtual world. The graphics may update and respond to the players actions from frame to frame. In another example, a user may view a movie or other multimedia content generated using computer graphics. A single image in these representations may be referred to as a frame. A frame may be composed of a multitude of triangles or other polygons to represent objects. A collection of sequential frames may be referred to as a scene.

Graphics engines have been created that allow developers to design, implement, and integrate graphics into their software applications and to deliver, release, and present these graphics to users. For example, the Open Graphics Library ("OpenGL") provides a cross-platform interface for rendering computer graphics. Such engines provide a set of functions that developers may leverage when designing computer graphics—i.e., an application programming interface ("API").

As graphics have grown more rich and complex, specialized hardware has been built to process the graphics pipelines used by these engines. These specialized hardware devices are known as GPUs. In essence, rendering a graphic demands quick and efficient processing of an extremely large amount of vertices/matrices, and GPUs may use parallel processing techniques to process these vertices/matrices concurrently. For such tasks, GPUs may achieve orders-of-magnitude better performance than a non-specialized CPU. This development has opened the door to the integration and delivery of still more complex and rich graphics.

However, as GPUs evolved to provide new functionality, optimizations, and parallelization, developers frequently had to install drivers and employ extensions to allow legacy graphics engines to leverage the new features. In this sense, older graphics engines such as OpenGL inefficiently harnessed the features of modern GPUs. Thus, newer graphic engines provide APIs specifically designed to leverage the capabilities of modern graphics cards. This paradigm includes graphics engines such as Vulkan, Direct3D 12, Metal, the Unreal Engine, and others. These tools leverage the parallel processing capabilities of modern GPUs and provide developers with maximum control over graphics hardware. However, these modern engines present a tradeoff. Namely, a developer has to interact with a more cumbersome and verbose API in which every detail related to the graphics needs to be managed and controlled. But these next-generation graphics engines in tandem with the capabilities of modern GPUs provide extremely high performance when rendering computer graphics.

Modern graphics engines may employ graphics pipelines. A graphics pipeline may provide a rigid structure that enables the parallel processing capabilities of modern GPUs. Essentially, a graphics pipeline is a sequence of operations performed by the graphics engine. The graphics pipeline may receive vertices, textures, and other information related to the composite polygons in a computer graphic. The graphics pipeline performs various transformative steps needed to render the graphic. For example, in Vulkan, the graphics pipeline performs input assembly, vertex shading, tessellation, geometry shading, rasterization, fragment shading, and color blending. Certain operations may be static and immutable in a graphics pipeline while others may be highly controllable/programmable by a developer using API functions. Developers can control behavior using, for example, the OpenGL shading language ("GLSL").

Graphics engines may use a depth buffer when rendering 3-D graphics. A depth buffer, also known as a z-buffer or w-buffer, is a type of data buffer used in computer graphics to represent depth information of objects in 3D space from a particular perspective. Depth buffers are an aid to rendering a scene to ensure that the correct polygons properly occlude other polygons. A depth buffer stores a depth for every pixel position in a frame.

A vertex shader is one stage in a graphics pipeline. A vertex shader may apply a variety of transformative steps that consider the position, color, texture, lighting, and other factors related to objects in a frame. The vertex shader may transform each vertex's 3-D position in a virtual space to the 2-D coordinate at which it appears on the screen. This transformation may be referred to as a projection transform. Depth values may be computed as a result of the projection transform. Depth testing may be performed using the depth buffer to resolve conflicts between overlapping polygons in a frame.

One particular feature provided by modern graphics engines and GPUs is called variable rate shading ("VRS"). VRS refers to the ability to control the shading rate of objects that a fragment shader applies. Without VRS, each pixel in a scene is shaded individually. This high level of treatment may require a large amount of GPU processing. With VRS, pixel shading rate may vary across a frame. For example, the Vulkan graphics engine provides a VRS extension (VK_KHR_fragment_shading_rate) that allows application developers to control shading rate across a frame. This allows developers to focus shading resources where needed to increase rendering performance and quality based on the characteristics of their application. For example, certain groups of pixels on a screen may be assigned a 1×1 shading rate to instantiate a fragment shader for each pixel. This may be important for pixels where a high level of detail is needed—e.g., in the center of a field of vision in a video game. However, certain pixels may not require such a high level of detail, and for such pixels lower shading rates may be selected, e.g., 2×2, 1×2, 2×4, 4×4, etc. This may be applicable for pixels at the peripheral of a field of vision, backgrounds, empty spaces, etc.

As modern graphics engines seek to maximally leverage GPU's capabilities, GPU strain continues to be a performance bottleneck and threshold. The resource crunch may be so significant that certain applications cannot function on certain devices. Moreover, mobile-device GPUs provide different architectures given their unique operating requirements— resources may be scarcer and GPUs may be less robust. Thus, GPU load control is especially important on mobile devices.

Accordingly, a need exists to reduce GPU load. Some legacy solutions attempt to reduce GPU load, but these legacy solutions operate by changing frame buffer size. This approach affects the graphic quality of the entire screen equally, adversely impacts the totality of the user experience, and does not achieve significant performance gains.

While VRS provides an option to reduce GPU load on the GPU, legacy approaches require the developer of the graphics application to set VRS for a particular frame/scene. For instance, a video game developer may configure the shading rate in the center of a field of vision to a high level and to a lower level on the peripheral to conserve the resources consumed by their application. But the developer has to make this decision and program the application accordingly. An end user has no control over this decision-making and implementation.

Thus, a need exists to programmatically perform partial quality control of VRS based on the characteristics of frames and scenes. In the disclosed approach, GPU loading may be reduced by applying different shading rates to different regions of a screen. In one embodiment, the disclosed approach employs a depth analyzer and a shading rate controller that work in tandem to control shading rates in computer graphics. The depth analyzer, responsive to commands in a graphics pipeline, calculates depth thresholds by reading the depth buffer. The shading rate controller then modifies graphics commands based on the calculated thresholds to control the shading rate of subsequent frames. By applying the technique, the end user may reduce GPU loading regardless of the shading rate programmed by the graphics application developer. GPU loading may be reduced without sacrificing meaningful quality because the depth analyzer intelligently calculates the depth thresholds.

The technique may be run on any platform that supports VRS hardware and primitive-based or image-based VRS. This approach avoids any need to modify the application program when implemented in a driver. In one embodiment, the technique is applied on a graphics driver installed on the client device to modify/update the commands received from a graphics application. In another embodiment, the technique may be applied in a firmware layer between hardware and a driver. In another embodiment, the technique may be applied in a software layer between a driver and an application. In yet another embodiment, the technique may be implemented in hardware on the client device.

In these embodiments, a technical benefit is realized by applying VRS to graphics to reduce GPU loading without requiring the application developer to manually determine and program the shading rates in the actual application. By reducing GPU loading, a further technical benefit is realized by reducing power consumption of devices. The approach is flexible and adaptable and configures VRS based on the frame generated by any suitable graphics application in near-real time.

FIG. 1 is a block diagram of an environment 100 including a client device that reduces GPU loading by applying VRS to graphics generated by a graphics application, according to some embodiments. Environment 100 may include client device 102, GPU load component 104, depth analyzer 105, shading rate controller 106, threshold transition module 107, graphics processing unit 108, display 110, graphics engine 115, and graphics application 120. Though illustrated as independent in FIG. 1, in other embodiments, these elements may exist on a single device, may be distributed and communicate using various communication protocols, or be organized in other suitable arrangements.

Client device 102 may be a desktop, workstation, laptop, notebook computer, digital assistant, netbook, tablet, smart phone, mobile phone, smart watch or other wearable, appliance, part of the Internet-of-Things, and/or embedded system, to name a few non-limiting examples, or any combination thereof. Client device 102 may allow a user to perform a variety of tasks that include accessing, running, or otherwise interacting with applications that produce computer graphics. Such applications may include games, multimedia/content delivery systems, social media tools, design products, word processors, spreadsheets, navigation systems, mobile applications, and many other suitable software programs. Graphics may be composed of a multitude of triangles or other polygons designed and constructed by the graphics application to form images perceptible to a human. Client device 102 may facilitate viewing and other interactions with these graphics. A particular image in a sequence of images access by client device 102 may be referred to as a "frame." A particular sequence of such frames may be referred to as a "scene." Graphics may be 2-D but also may be 3-D, and person of skill in the art would understand that a multitude of techniques exist to render a 3-D representation of geometric data into a 2-D image for display. For example, a viewing frustum may be used that is a region of space in a modeled world representing a pyramid of vision that appears to the user of client device 102 when viewing graphics.

In one embodiment, client device 102 may access graphics by downloading and installing a graphics-creating application and then running the application. In another embodiment, client device 102 may receive graphics from a graphics-generating application via a network or using another suitable communication protocol or mechanism. In some embodiments, client device 102 may additionally install or otherwise rely upon an appropriate client-side graphics engine or driver (such as described below as graphics engine 115) to further aid in rendering, receiving, and processing of computer graphics. Though in other embodiments, a graphics engine may be accessed externally or otherwise relied upon by the graphics-generating application.

GPU load component 104 may operate on client device 102 and reduce GPU loading by programmatically controlling shading rates. GPU load component 104 may enforce VRS based on the characteristics of frames in a received computer graphic. GPU load component 104 may reduce GPU load by applying different shading rates to different regions of a screen in near-real time. By applying the technique, GPU load component 104 may reduce the load on a GPU regardless of the shading rates programmed by the graphics application developer. This technique is described in greater detail below.

GPU load component 104 may run in a graphics driver installed on client device 102, in a firmware layer between hardware and a driver, in a software layer between a driver and an application, or in any other suitable configuration. GPU load component 104 may include depth analyzer 105, shading rate controller 106, and threshold transition module 107.

Depth analyzer 105 may read graphic commands and/or process a frame in a graphic generated by graphics application 120 to collect details about a depth buffer. Depth analyzer 105 may then use the depth buffer for the graphic as input in an algorithm that computes one or more depth thresholds. These depth thresholds are used to set the shading rate for particular screen regions for subsequent frames using the VRS capabilities of graphics engines and GPUs. Depth analyzer 105 may determine the depth thresholds by performing image processing to analyze characteristics of depth using a variety of suitable analysis techniques. Such techniques may consider statistics of depth (e.g., minima, maxima, medium, etc.), histogram distribution of depth, spatial distribution of depth, clustering or segmentation of depth (e.g., using kernel density estimation, K-means, Gaussian mixture model, etc.). These depth thresholds may not be constant, and may vary as a scene changes. For example, in an embodiment where pixel depth value is expressed as a floating-point number with a range of [0.0f, 1.0f], a depth threshold may be a floating-point number with a range of [0.0f, 1.0f] to be used for later comparison. In another embodiment, the depth thresholds may be expressed algebraically, geometrically, or using other suitable method. For example, an expression or equation may be employed as a depth threshold provided the equation produces a value within the implemented floating-point number range (e.g., [0.0f, 1.0f]). Using such an approach, the depth threshold may adaptively change within a single frame in addition to changing across frames. In some embodiments, depth analyzer 105 may use a down sample to increase efficiency. Depth analyzer 105 may then output calculated depth thresholds to shading rate controller 106. In one embodiment described in further detail below with reference to FIG. 5, depth analyzer 105 may also compute strides to apply to threshold for normal/non-sample frames to achieve efficiency gains. Depth analyzer 105 may calculate strides with reference to prior sample frames or using another suitable approach.

Shading rate controller 106 may control the shading rate for subsequent frames in a scene using the depth thresholds. Shading rate controller 106 may receive depth thresholds from depth analyzer 105. Shading rate controller 106 may employ an interception framework that intercepts shader-related commands. The interception framework may be installed/inserted on a message path between graphics application 120 and hardware or in another suitable location. In one embodiment, shading rate controller 106 may modify one or more shader configuration commands and add an appropriate VRS configuration command to the intercepted shader-related commands. For example, shading rate controller 106 may use appropriately formatted GLSL commands to control the shading rate either by modifying the GLSL command or by inserting an additional command into a command buffer. The GLSL language may provide the primitive-based VRS and may be activated by a built-in variable defined in a vertex shader or other shader capable of controlling shading rate. Because the shader knows the depth value of polygons, the shader may then perform a threshold comparison to determine the depth region of a triangle and set the built-in VRS variable. Thus, shading rate controller 106 may configure a shader/pipeline by: (1) passing depth thresholds into the shader; (2) adding depth threshold comparison operation; and (3) activating a built-in VRS variable. In other embodiments, shading rate controller 106 may only modify graphics commands to apply VRS and/or only insert additional commands into a command buffer to set appropriate shading rates.

In an alternative embodiment, shading rate controller 106 may create and attach a shading rate lookup image on a render-pass. This technique may be known as image-based VRS. In such an embodiment, shading rate controller 106 may create a lookup image that controls the shading rate in a frame. The lookup image may specify shading rate on a per-tile or per-pixel basis or using another suitable approach. In one embodiment, a tile may contain a number of coarse pixels, and each coarse pixel may contain a number of pixels. The size of a tile in a lookup image may vary based on the hardware used. The size of a coarse pixel may be a VRS setting (e.g., 1×1, 2×2, etc.) More detail about performing image-based VRS is provided below with reference to FIGS. 6A-6D.

Threshold transition module 107 may determine thresholds to apply for normal frames, i.e., non-sample frames. In an embodiment, a "sample" frame is a frame for which depth analyzer 105 performs image processing to determine appropriate depth thresholds based on the depth buffer. In this embodiment, a "normal" frame may be a frame for which threshold transition module 107 determines thresholds without having to read the depth buffer. Threshold transition module 107 may receive calculated thresholds and strides from depth analyzer 105 or determine the thresholds and strides using a suitable approach. As discussed above, depth thresholds may be algebraic or geometric thresholds used to set VRS for particular screen regions for subsequent frames in a scene. A "stride" may be an estimated rate of change between frames for these depth thresholds. In one embodiment, threshold transition module 107 may calculate strides with reference to prior sample frames. That is, threshold transition module 107 may determine appropriate strides based on changes from one sample frame to the next. Strides, thresholds, and normal/sample frames are discussed in further detail below with reference to FIGS. 4A and 4B. The behavior of threshold transition module 107 is described in further detail below with reference to FIG. 5.

Graphics processing unit 108 may be a specialized electronic circuit designed to process mathematically intensive applications such as computer graphics. Graphics processing unit 108 can have a parallel structure that efficiently parallel processes large blocks of data, such as mathematically intensive data used in computer graphics applications, images, videos, etc. That is, graphics processing requires the quick and efficient processing of an extremely large amount of vertices/matrices, and graphics processing unit 108 may be specifically designed to perform these tasks. Graphics processing unit 108 may provide vastly greater efficiency in conducting such tasks over a non-specialized CPU. Graphics processing unit 108 may support VRS and provide optimizations and features related to rendering scenes with VRS.

Display 110 may be used by client device 102 to present computer graphics generated by graphics application 120 to a user of client device 102. Display 110 may be a monitor, screen display, television, virtual reality headset, or other such suitable output device capable of displaying computer graphics.

Graphics engine 115 may be a tool that allows a developer to design, implement, and integrate graphics into their software applications and to deliver, release, and present these graphics to users. Graphics engine 115 may present an API offering a set of functions that developers may leverage when designing computer graphics employed by software applications. Examples of graphics engine 115 may include OpenGL, Vulkan, Direct3D 12 ("DX12"), Metal, the Unreal Engine, and other suitable engine. Graphics engine 115 may employ a graphics pipeline that performs various transformative steps needed to efficiently render a graphic. Graphics engine 115 may leverage a depth buffer (i.e., a z-buffer or w-buffer) when rendering 3-D graphics that stores depth for every position in a frame. Graphics engine 115 may use a vertex shader in a graphics pipeline that applies a variety of transformative steps that consider the position, color, texture, lighting, and other factors related to the pixels in a frame.

Graphics engine 115 may support VRS. This feature enables control of the shading rate applied by a fragment shader to particular portions of a frame. With VRS, pixel shading rate may vary across a frame. For example, Vulkan provides a fragment shading rate (i.e., "VK_KHR_fragment_shading_rate") extension that allows application developers to control fragment shading rates. This feature increases rendering performance. Certain portions of a frame may be assigned a 1×1, 2×2, 1×2, 2×4, or 4×4 shading rate. Graphics engine 115 may support either primitive-based VRS or image-based VRS. In some embodiments, graphics engine 115 may include client-side components that run on client device 102.

Graphics application 120 may be an application that provides computer graphics to users. Graphics application 120 be a computer game, multimedia/content delivery system, social media tool, design product, word processor, spreadsheet, navigation system, mobile application, and any other suitable software application that generates graphics. Although displayed separately in FIG. 1, in some embodiments, either graphics engine 115 or graphics application 120 may be installed on client device 102.

FIGS. 2A-2D are example screen displays that illustrate the application of VRS to objects in a scene, according to some embodiments. The screen display provided in FIGS. 2A-2D are merely exemplary, and one skilled in the relevant arts will appreciate that many approaches may be taken to provide suitable screen display in accordance with this disclosure.

FIG. 2A illustrates screen display 200A presenting an original frame in a scene (i.e., prior to any modifications performed by the disclosed technique) in a computer graphic. Screen display 200A may be a single frame in a scene that combines a sequence of frames to form a computer graphic. Screen display 200A may include object 204A, object 204B, and object 204C. In this example, object 204A is a dog, object 204B is a person, and object 204C is a tree, but this is merely illustrative and any number of abstract and non-abstract objects may be represented in a computer graphic. In some embodiments, there may be only object and in others there may be hundreds, thousands, or millions. Objects 204A-C may be composed of polygons, e.g., triangles. Objects 204A-C may have a variety of characteristics including color, transparence, etc. Screen display 200A may have lighting, shading, and other characteristics that impact the rendering of objects 204A-C.

FIG. 2B illustrates screen display 200B presenting an image of a depth buffer extracted from the frame buffer of screen display 200A. Screen display 200B is presented as a gray-scale image with the depth value of each pixel within a range of [0.0f, 1.0f]. In screen display 200B, depth threshold 206A and depth threshold 206B represent the calculated thresholds. Depth threshold 206A and depth threshold 206B may be computed based on the information in a first frame such as screen display 200B. Depth threshold 206A and depth threshold 206B may be applied when rendering a next frame such as screen display 200C. Depth threshold 206A and depth threshold 206B may be expressed algebraically, geometrically, or using other suitable method.

FIG. 2C illustrates screen display 200C presenting a frame after shading rate controller 106 applies VRS based on the depth thresholds calculated by depth analyzer 105. Screen display 200C may include screen region 208A, screen region 208B, and screen region 208C as determined with reference to thresholds 206A-B. In screen display 200C, because object 204A falls within screen region 208A, a sharp (e.g., 1×1) shading rate is applied to the object. Object 204B receives a slightly lower VRS setting because it falls within screen region 208B, and object 204C receives the lowest VRS setting because it falls within region 208C. One skilled in the relevant arts will understand that by applying the lower and/or higher shading rate to certain objects, load on graphics processing unit 108 may be reduced.

FIG. 2D illustrates screen display 200D presenting a second frame with depth thresholds and shading rates applied to the objects. Screen display 200D illustrates that if the location of an object changes due to the scene changing, the shading rate of the object may change. For example, in screen display 200D, object 204A (a dog) moved into screen region 208B, so the algorithm applies the lower shading rate to object 204A. While object 204B (a person) now receives the sharper shading rate having moved into screen region 208A.

While screen displays 200A-200D are merely exemplary, the displays illustrate the general application of VRS to objects in a scene. GPU loading may be reduced by applying VRS programmatically to a scene as described in the method in FIGS. 3A and 3B.

Figure 3A:
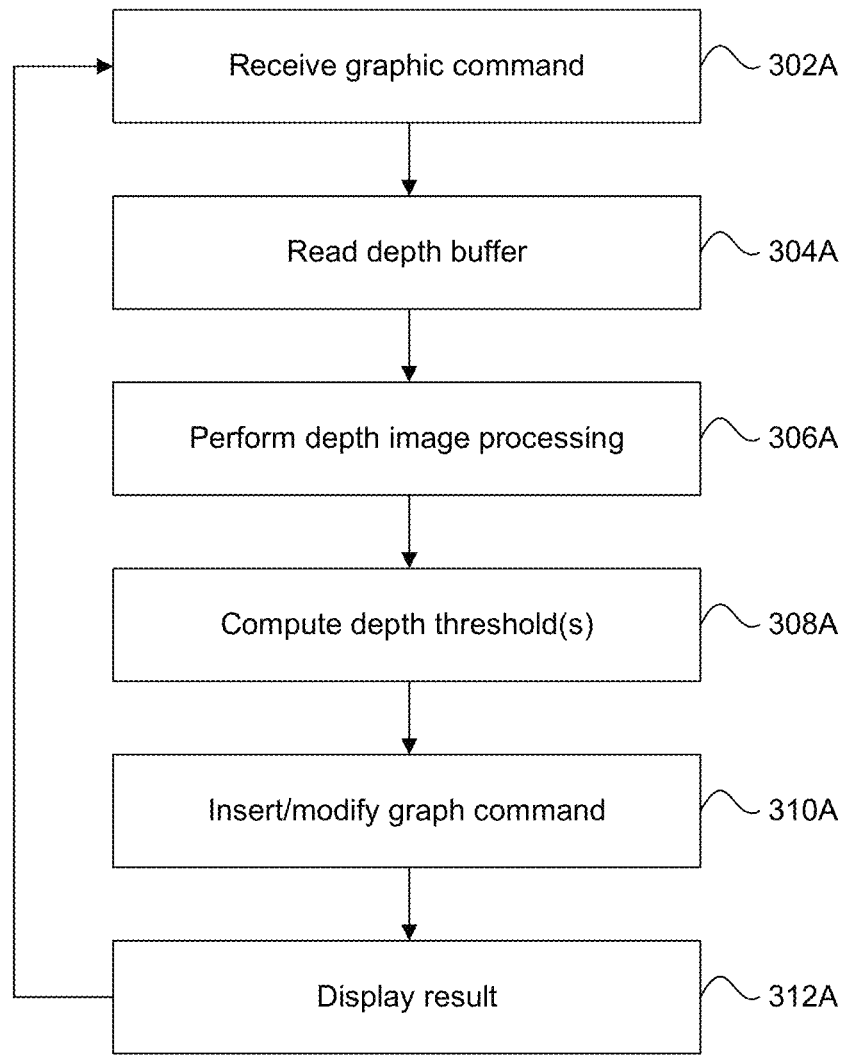
FIG. 3A is a flowchart illustrating a method of controlling shading rates in a scene to reduce GPU loading, according to some embodiments.

FIG. 3A is a flowchart illustrating method 300A of controlling shading rates in a scene to reduce GPU loading, according to some embodiments. Method 300A can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3A, as will be understood by a person of ordinary skill in the art(s).

In 302A, depth analyzer 105 may receive a set of graphics commands, a frame, or a result of the graphic commands. Depth analyzer 105 may receive the commands/frame from graphics application 120 and/or graphics engine 115. In an embodiment, depth analyzer 105 may receive a graphic command from graphics application 120 that is passed into hardware through a driver. The graphic command may be stored in a command buffer or processed immediately depending on the design of the graphic language. In one approach, an interception framework may be installed/inserted on a message path between the application and hardware (e.g., graphics processing unit 108). In this approach, depth analyzer 105 may monitor all passed graphic commands to collect the requisite information (e.g., buffer address, depth property, shader information, etc.). Depth analyzer 105 may then use this information to read back depth buffer from memory. This interception framework may also be used to allow shading rate controller 106 to modify or add commands (e.g., configure VRS function, execute depth analysis job, etc.) and pass the modified/added commands to a downstream layer and eventually to hardware.

In 304A, depth analyzer 105 may read the depth buffer of a frame. In an embodiment, the depth buffer may include ranges of depth for each pixel in the frame, e.g., from 0.0 to 1.0. In one embodiment, depth analyzer 105 may read the depth buffer by sending an appropriate command to graphics engine 115. In another embodiment, depth analyzer 105 may determine the depth buffer of the frame by examining the frame.

In 306A, depth analyzer 105 may perform image processing to analyze characteristics of depth. For example, depth analyzer 105 may consult statistics of depth like minima, maxima, median, etc. Depth analyzer 105 may build a histogram distribution of depth or a spatial distribution of depth. Depth analyzer 105 may use clustering or segmentation of depth through algorithms such as kernel density estimation, K-Means, Gaussian mixture model, etc.

In 308A, depth analyzer 105 may compute depth thresholds based on the characteristics determined in 306A. Depth analyzer 105 may compute a single depth threshold or multiple depth thresholds. Depth analyzer 105 may compute multiple depth thresholds with each depth range divided by depth threshold corresponding to one shading rate. For example, a depth range farther/higher than a threshold A may apply a 2×2 shading rate, a range between threshold B and threshold A may apply a 2×1 shading rate, and a range nearer/lower than threshold B may apply 1×1 shading rate. In other embodiments, the relationship between near/far and high/low may be inversed. The depth thresholds may be expressed algebraically, geometrically, or using other suitable method. Depth analyzer 105 may send the depth thresholds to shading rate controller 106.

In 310A, shading rate controller 106 may insert or modify graphics commands to apply VRS to a subsequent frame based on the depth thresholds. In one embodiment, shading rate controller 106 may use primitive-based VRS. For example, the graphic command used to control shading rate may be the primitive-based VRS API provided in a shading language (e.g., GLSL). In one exemplary approach, shading rate controller 106 may apply a particular shading rate to pixels in a screen region that are higher or lower than the depth thresholds. For example, the VK_KHR_fragment_shading_rate extension on Vulkan may be inserted into the graphics command buffer to control the shading rates of subsequent frames. For example, in Vulkan, shading rate controller 106 may use PrimitiveShadingRateKHR. In another embodiment, shading rate controller 106 may control the shading rates using image-based VRS. For example, shading rate controller 106 may create a lookup image and provide a fragment shading rate attachment and using Vulkan's VkFragmentShadingRateAttachmentInfoKHR.

In 312A, client device 102 may render a resulting frame on display 110. Depending on the calculated thresholds and subsequently modified commands, certain regions of the frame may have different shading rates applied than other regions. Method 300 may then return to 302 to process the next frame and/or set of graphic commands in the command buffer. In this sense, method 300 is iterative and continues to adjust VRS based on changes in the computer graphic over time.

Figure 3B:
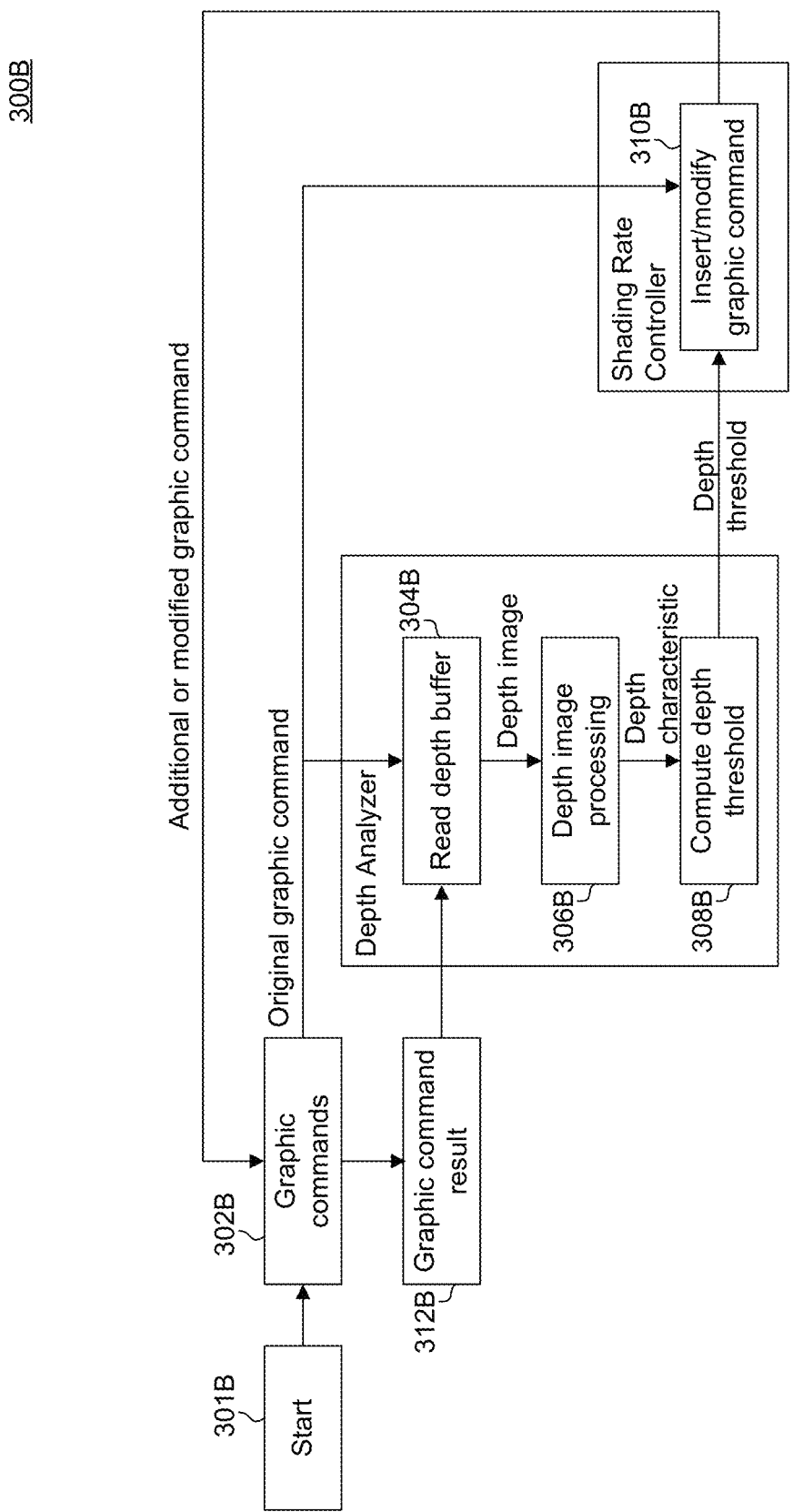
FIG. 3B is a flowchart illustrating an alternative method of controlling shading rates in a scene to reduce GPU loading, according to some embodiments.

FIG. 3B is a flowchart illustrating a method 300B of controlling shading rates in a scene to reduce GPU loading, according to some embodiments. Method 300B can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3B, as will be understood by a person of ordinary skill in the art(s).

Method 300B presents an alternative method of performing method 300A described above. Method 300B illustrates similar steps as method 300A. Step 302B in method 300B corresponds to step 302A in method 300A. Step 304B corresponds to step 304A. Step 306B corresponds to step 306A. Step 308B corresponds to step 308A. Step 310B corresponds to step 310A. Step 312B corresponds to step 312A. Method 300B additionally illustrates an embodiment that divides the performance of these steps between depth analyzer 105 and shading rate controller 106.

Figure 4A:
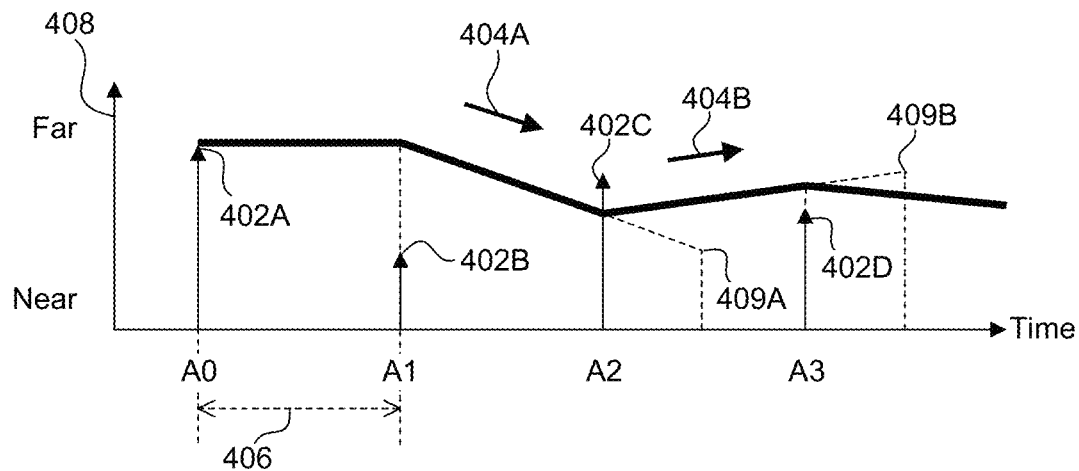
FIG. 4A is a diagram illustrating strides and thresholds, according to some embodiments.
Figure 4B:
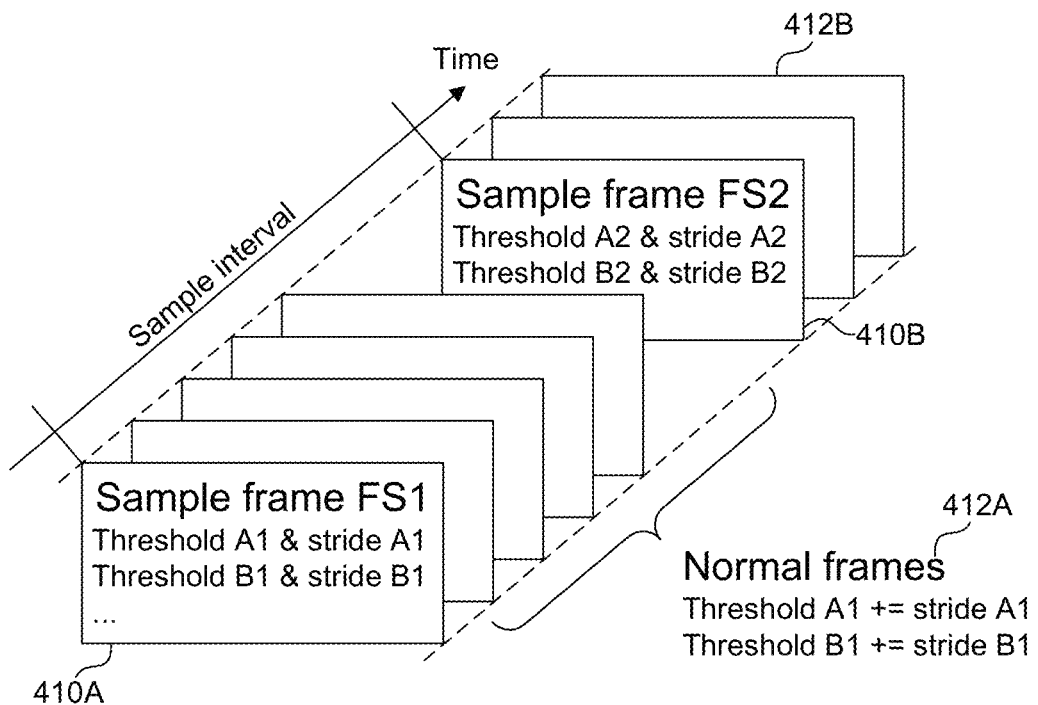
FIG. 4B is a diagram illustrating sample and normal frames, according to some embodiments.

FIGS. 4A-B illustrate several concepts relied upon by the embodiment that achieves efficiency gains when controlling shading rates in a scene to reduce GPU loading. In this embodiment, GPU load component 104 may divides frames in a scene into "sample" frames and "normal" frames. By only determining thresholds for "sample" frames, GPU load component 104 may achieve efficiency gains because performing image processing and/or reading the buffer depth may be computationally expensive.

FIG. 4B is a diagram illustrating a division of a scene into sample frames 410A-B and normal frames 412A-B.

Sample frames 410A-B may be frames for which depth analyzer 106 reads the depth buffer of the frame, performs depth image processing to analyze characteristics of depth, and computes depth thresholds and strides (i.e., estimated rates of change in depth thresholds over time). For example, sample frame 410A and sample frame 410B may be selected from a scene periodically, at intervals, e.g., every other frame, every tenth frame, every hundredth frame, etc., randomly, or according any other suitable methodology that may vary with the particular implementation.

Normal frames 412A-B may be frames for which threshold transition module 107 calculates thresholds using estimated strides (discussed below as strides 404A-B)—i.e., without having to process the image or read the depth buffer. By avoiding reading the buffer depth and/or performing image processing of normal frames 412A-B, threshold transition module 107 may improve the efficiency of the method of controlling shading rates in a scene to reduce GPU loading.

FIG. 4A is an exemplary diagram that further illustrates strides, thresholds, and a sample interval as time passes in a scene. FIG. 4A includes thresholds 402A-D, strides 404A-B, sample interval 406, threshold range 408, and points 409A-B, according to some embodiments.

Thresholds 402A-D illustrate exemplary depth thresholds that may be calculated by depth analyzer 105. In this illustrative example, only a single depth threshold is calculated at each time A0, A1, A2, etc. But multiple depth thresholds may be calculated at each time within the scope of this disclosure. In the exemplary illustration in FIG. 4A, sample frames occur at times A0, A1, A2, and A3. Normal (non-sample) frames occur in between these times, and in particular, at point 409A and point 409B. For sample frames, depth analyzer 105 may read depth buffer, perform image processing, and compute the depth threshold. That is, depth analyzer 105 may calculate threshold 402A at time A0, threshold 402B at time A1, threshold 402C at time A2, and threshold 402D at time A3, etc. As indicated in FIG. 4A, thresholds 402A-D may change over time as a scene changes. Thresholds 402A-D may be determined at each sample frame by analyzing characteristics of depth using a suitable analysis technique. Such techniques may consider statistics of depth (e.g., minima, maxima, medium, etc.), histogram distribution of depth, spatial distribution of depth, clustering or segmentation of depth (e.g., using kernel density estimation, K-means, Gaussian mixture model, etc.). Thresholds 402A-D may be expressed algebraically, geometrically, or using other suitable method.

Regions of time between times A0, A1, A2, and A3 may be composed of normal frames. In a normal frame, depth analyzer 105 may use the prior threshold in combination with strides 404A-B to determine depth thresholds to apply to a particular frame. Strides 404A-B may be estimated rates of change that apply to previously calculated depth thresholds to determine thresholds to apply for subsequent normal frames. Strides 404A-B may recomputed as a scene progresses and may be used to estimate the shading rates to apply to normal frames. Strides 404A-B may be computed by extrapolating the depth threshold of current and previous frames. The extrapolation method may be linear, polynomial, cubic, etc. For example, by extrapolating threshold 402A and threshold 402B, threshold transition module 107 may derive a down-sloping stride 404A and use this stride to determine the depth threshold to apply to normal frames between times A1 and A2. Similarly, by extrapolating threshold 402B and threshold 402C, threshold transition module 107 may derive an upward-sloping stride 404B and use this stride to determine the depth threshold to apply between times A2 and A3. If the threshold is getting farther, strides 404A-B may be upward-sloping, i.e., set such that the depth threshold continues to increase from normal frame to normal frame. If the threshold is getting nearer, strides 404A-B may be downward-sloping, i.e., set such that the depth threshold continues to decrease from normal frame to normal frame.

Point 409A and point 409B illustrate the principle that a time delay may exist between when a new threshold may be calculated and when the newly calculated threshold may be applied. That is, a newly calculated threshold may be applied only after the information about depth becomes available (which occurs when all objects have been drawn with the prior threshold and stride combination). Thus, at point 409A, threshold transition module 107 may calculate the depth threshold calculated using stride 404A even into the period between time A2 and time A3, which results in the dotted line at 409A. This may continue until a new threshold becomes available for actual application (e.g., threshold 402C). Similarly, at point 409B, stride 404B may continue to be used to calculate the depth threshold until the new threshold (threshold 402D) becomes available for application.

Sample interval 406 may be a number of frames between sample frames 410A-B. Sample interval 406 may be static or variable. Sample interval 406 may differ between implementations. For example, sample frames 410A-B may be selected periodically or at intervals, e.g., every other frame, every tenth frame, every hundredth frame, etc., according to the particular implementation. In some embodiments, sample interval 406 may be consistent (i.e., the same rate of sampling), but in other embodiments sample interval 406 may change over time.

Threshold range 408 may represent a range of available depth thresholds. Depth thresholds may be implementation specific. For example, in a Vulkan implementation, the available depth thresholds may run from 0.0 to 1.0. Other suitable ranges may apply to threshold range 408 in other implementations.

Figure 5A:
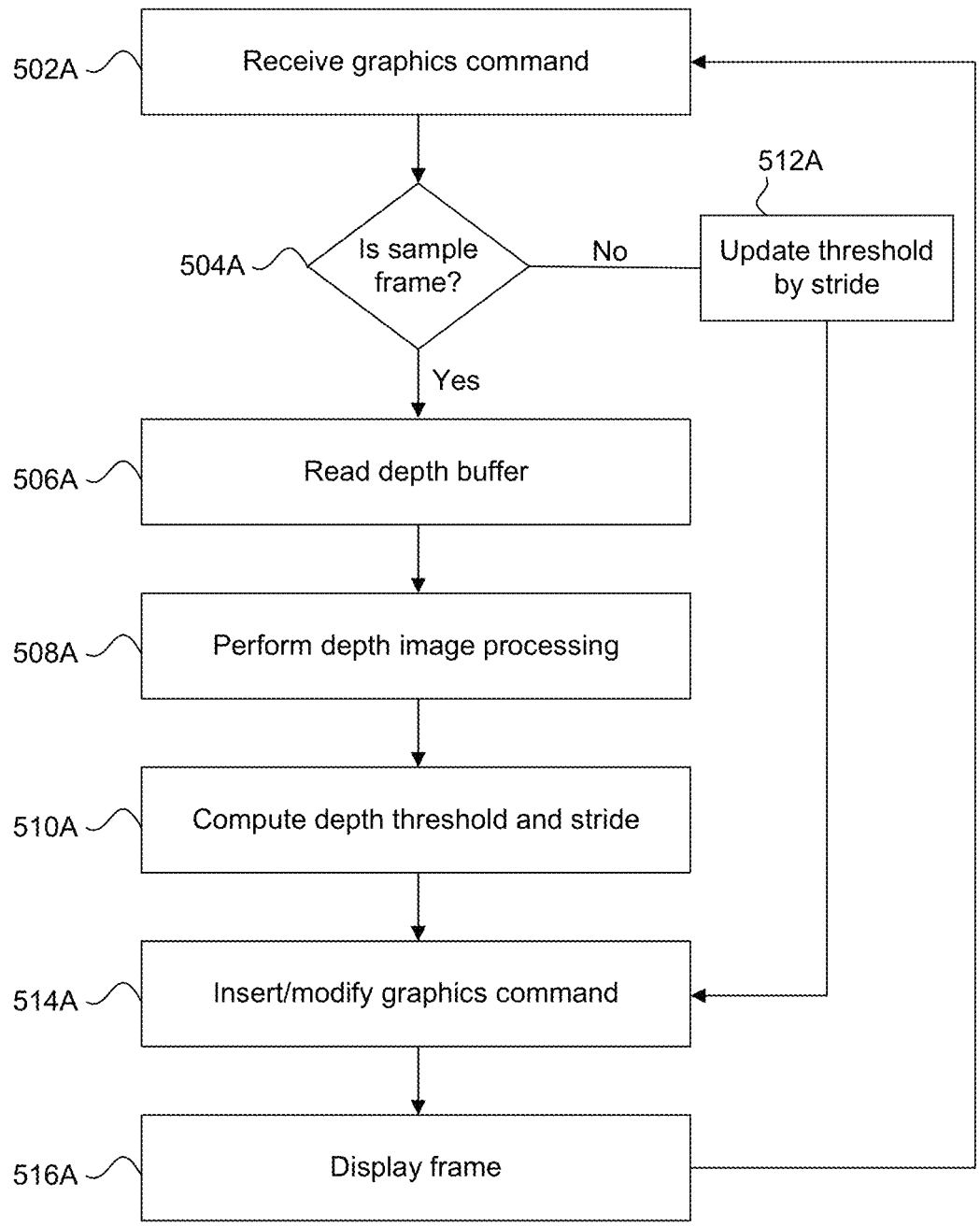
FIG. 5A is a flowchart illustrating a method of controlling shading rates in a scene to reduce GPU loading by dividing a scene into normal and sample frames, according to some embodiments.

FIG. 5A is a flowchart illustrating method 500A of controlling shading rates in a scene to reduce GPU loading by dividing a scene into normal and sample frames, according to some embodiments. Method 500A can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5A, as will be understood by a person of ordinary skill in the art(s).

In 502A, depth analyzer 105 may receive a set of graphics commands, a frame, or a result of the graphic commands.

Depth analyzer 105 may receive the commands/frame from graphics application 120 and/or graphics engine 115.

In 504A, GPU load component 104 may determine if the current frame is a sample frame. If the current frame is a sample frame, then method 500 proceeds to 506. If the current frame is not a sample frame (i.e., is a normal frame), then method 500 proceeds to 512.

In 506A, where the current frame is a sample frame, depth analyzer 105 may read the depth buffer of the frame. In an embodiment, the depth buffer may include ranges of depth for each pixel in the frame, e.g., from 0.0 to 1.0. In one embodiment, depth analyzer 105 may read the depth buffer by sending an appropriate command to graphics engine 115. In another embodiment, depth analyzer 105 may determine the depth buffer of the frame by examining the frame.

In 508A, depth analyzer 105 may perform depth image processing to analyze characteristics of depth. For example, depth analyzer 105 may consult statistics of depth like minima, maxima, median, etc. Depth analyzer 105 may build a histogram distribution of depth or a spatial distribution of depth. Depth analyzer 105 may use clustering or segmentation of depth through algorithms such as kernel density estimation, K-Means, Gaussian mixture model, etc.

In 510A, depth analyzer 105 may compute depth thresholds and strides based on the determined characteristics. Depth analyzer 105 may compute a single depth threshold or multiple depth thresholds. Depth analyzer 105 may compute multiple depth thresholds with each depth range divided by depth threshold corresponding to one shading rate. For example, depth range farther than threshold A may apply a 2×2 shading rate, a range between threshold B and threshold A may apply a 2×1 shading rate, and a range nearer than threshold B may apply 1×1 shading rate. Depth analyzer 105 may send the depth thresholds to shading rate controller 106. Stride may be calculated with reference to previous frames. Depth analyzer 105 may determine the thresholds by analyzing characteristics of depth using a variety of suitable analysis techniques. Such techniques may consider statistics of depth (e.g., minima, maxima, medium, etc.), histogram distribution of depth, spatial distribution of depth, clustering or segmentation of depth (e.g., using kernel density estimation, K-means, Gaussian mixture model, etc.). Depth analyzer 105 may estimate the strides by extrapolation of depth threshold of current and previous frames. For example, the extrapolation method may be linear, polynomial, cubic, etc. If the threshold is getting father, depth analyzer 105 may set the strides such that the depth threshold continues to increase during normal frame.

Returning to 512A, where the current frame is a normal frame, threshold transition module 107 may update the threshold using previously calculated strides. For a normal frame, the depth buffer does not need to be read by depth analyzer 105 to save resources. Thus, threshold transition module 107 updates the prior depth threshold by the previously calculated stride, i.e., threshold A1+=stride_A1, threshold A2+=stride_A2, etc. More than one threshold and more than one stride may apply, depending on how many thresholds are calculated for a prior sample frame.

In 514A, shading rate controller 106 may insert or modify graphics commands to apply VRS to a subsequent frame based on the depth thresholds. In one approach, shading rate controller 106 may use primitive-based VRS. For example, the graphic command used to control shading rate may be the primitive-based VRS API provided in a shading language (e.g., GLSL). For example, the VK_KHR_fragment_shading_rate extension on Vulkan may be engaged to control the shading rates of subsequent frames. In one approach, shading rate controller 106 may insert additional graphics commands into the graphics pipeline to control the shading rate. For example, in Vulkan, shading rate controller 106 may use PrimitiveShadingRateKHR. In another embodiment, shading rate controller 106 using image-based VRS. For example, shading rate controller 106 may create a lookup image and provide a fragment shading rate attachment and using VkFragmentShadingRateAttachmentInfoKHR.

In 516A, client device 102 may render a resulting frame on display 110. Depending on the calculated thresholds and subsequently modified commands, certain regions of the frame may have VRS applied.

Method 500 may then return to 502 to process the next frame and/or graphic command. In this sense, method 500 is iterative and continues to adjust VRS based on changes in the computer graphic over time.

Figure 5B:
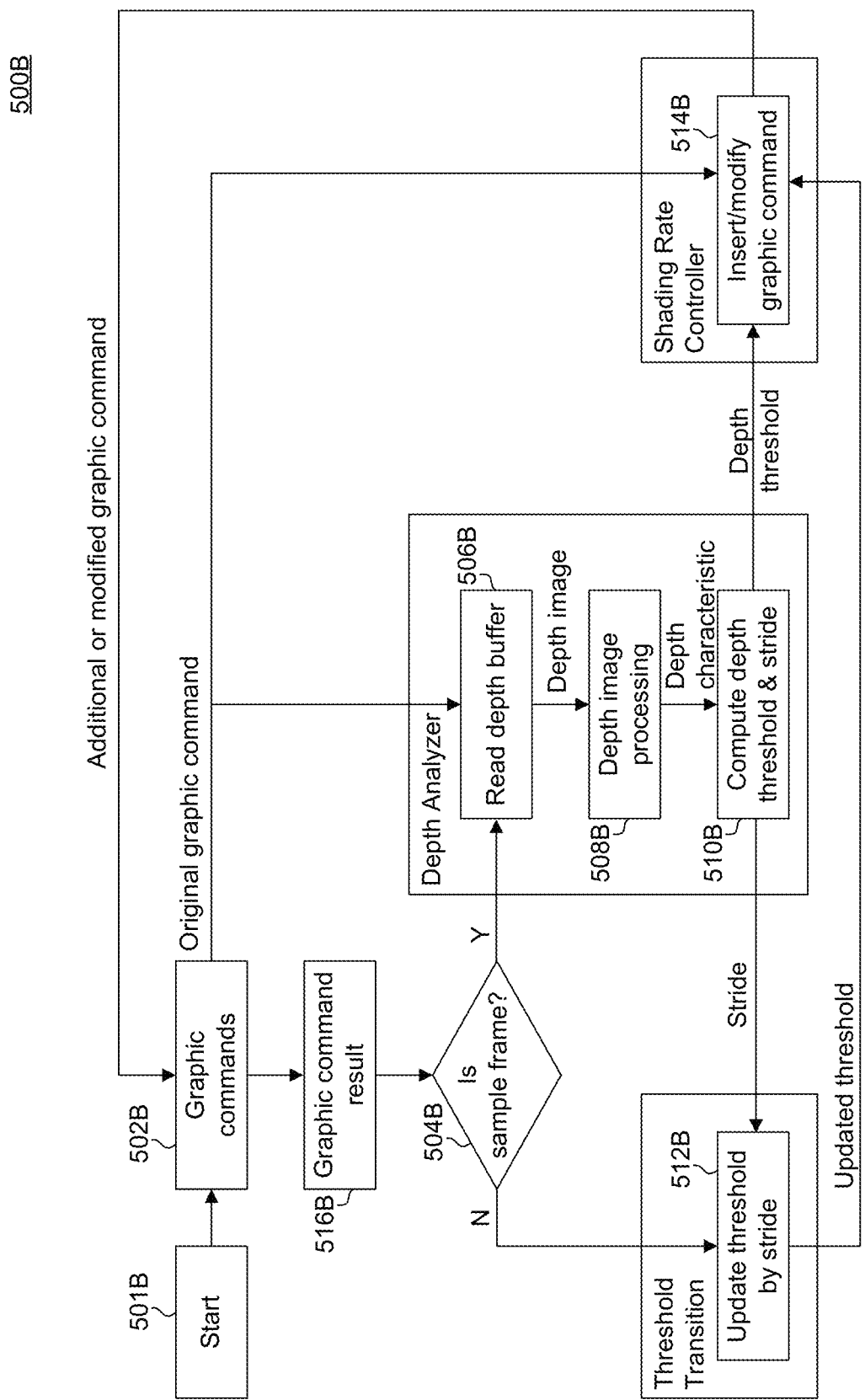
FIG. 5B is a flowchart illustrating an alternative method of controlling shading rates in a scene to reduce GPU loading by dividing a scene into normal and sample frames, according to some embodiments.

FIG. 5B is a flowchart illustrating method 500B of controlling shading rates in a scene to reduce GPU loading by dividing a scene into normal and sample frames, according to some embodiments. Method 500B can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5B, as will be understood by a person of ordinary skill in the art(s).

Method 500B presents an alternative method of performing method 500A described above. Method 500B illustrates similar steps as method 500A. Step 502B in method 500B corresponds to step 502A in method 500A. Step 504B corresponds to step 504A. Step 506B corresponds to step 506A. Step 508B corresponds to step 508A. Step 510B corresponds to step 510A. Step 512B corresponds to step 512A. Step 514B corresponds to step 514A. Step 516B corresponds to step 516A. Method 500B additionally illustrates an embodiment that divides the performance of these steps between depth analyzer 105, shading rate controller 106, and threshold transition module 107.

FIGS. 6A-6D are example screen displays that illustrate the use of a VRS lookup image to control the shading rates in a frame, according to some embodiments. The screen display provided in FIGS. 6A-6D are merely exemplary, and one skilled in the relevant art(s) will appreciate that many approaches may be taken to provide suitable screen display in accordance with this disclosure. The screen displays in FIGS. 6A-6D illustrate a simple illustrative case having several objects in a frame of a computer graphic.

FIG. 6A illustrates screen display 600A presenting an original scene (i.e., prior to any modifications performed by the disclosed technique) in a computer graphic. Screen display 600A may be a single frame in a series of frames that combine to form a computer graphic. Screen display 600A may include object 204A, object 204B, and object 204C. In this example, object 204A is a dog, object 204B is a person, and object 204C is a tree, but this is merely illustrative and any number of objects may be represented in a computer graphic.

FIG. 6B illustrates screen display 600B presenting a version of the scene in which depth analyzer 105 calculated depth thresholds, i.e. depth threshold 206A and depth threshold 206B. Depth threshold 206A and depth threshold 206B may be computed based on the information in a first frame such as screen display 600B. Depth threshold 206A and depth threshold 206B may be applied when rendering a next frame.

FIG. 6C illustrates screen display 600C presenting a VRS lookup image created by shading rate controller 106 based on the calculated thresholds. This lookup image may control the shading rate in a frame by specifying shading rate on a per-tile or per-pixel basis or using another suitable approach. In one approach, shading rate controller 106 may determine the shading rate of each tile in a lookup image (i.e., the pixel/tile value) by comparing the generated depth thresholds with a region depth of the tile. The size of the lookup image and the size of a tile in the lookup image may vary based on the hardware used by client device 102.

FIG. 6D illustrates screen display 600D presenting a second frame with depth thresholds and shading rates applied to the objects based on the VRS lookup image. Shading rate controller 106 may create and attach a shading rate lookup image on renderpass to enforce VRS. For example, shading rate controller 106 may provide a fragment shading rate attachment using VkFragmentShadingRateAttachmentInfoKHR. Based on the lookup image, different shading rates are applied to object 204A, object 204B, and object 204C, respectively.

Figure 7:
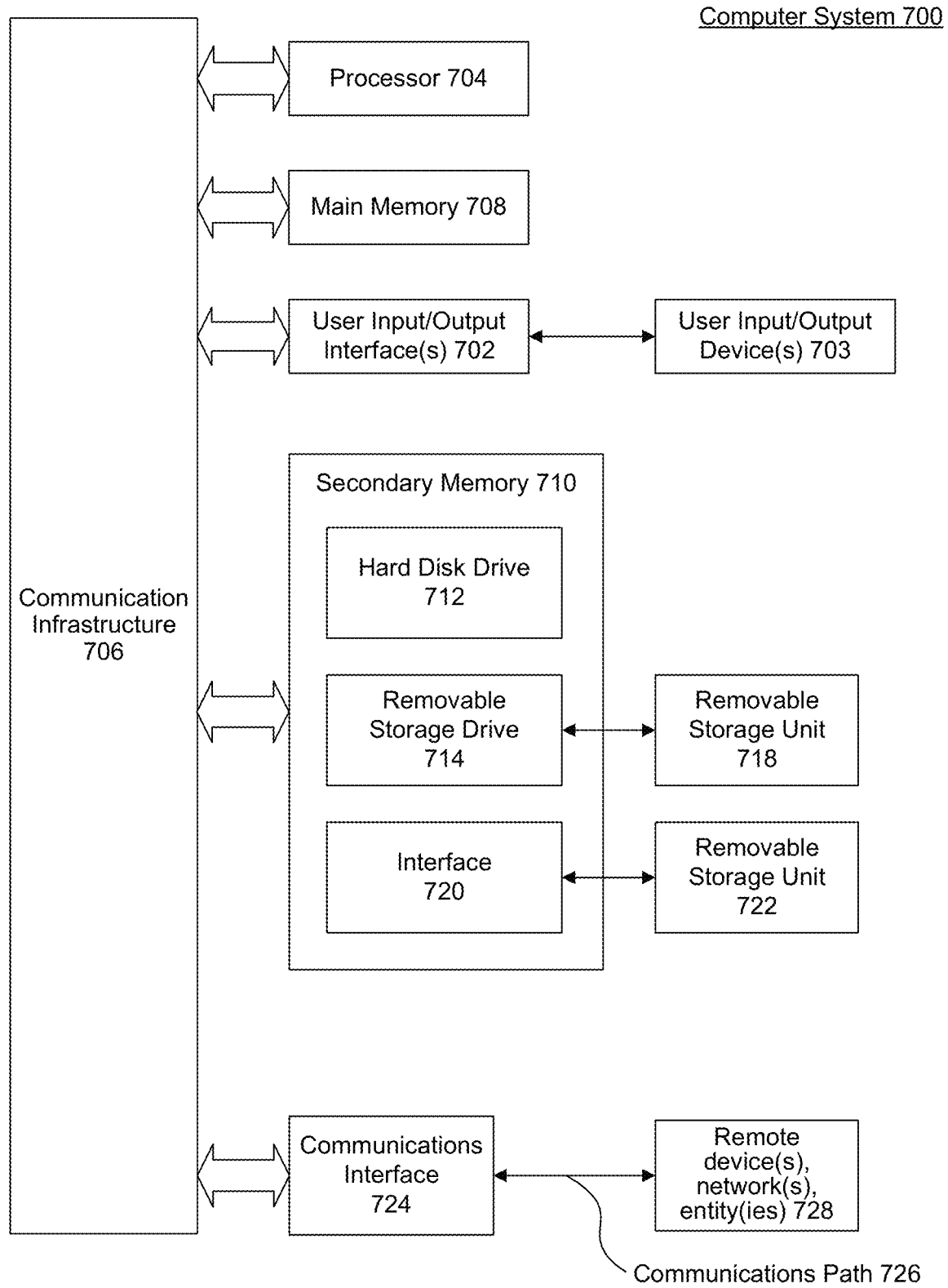
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for reducing graphics processing unit load by programmatically controlling shading rates in computer graphics, comprising:
    processing, at a client device having one or more processors, at least one graphic command to present a first frame of a computer graphic;
    calculating one or more depth thresholds by analyzing a spatial distribution of depth in a depth buffer associated with the first frame; and
    controlling a shading rate for a second frame of the computer graphic by applying one or more shading rates to one or more screen regions of the second frame based on the one or more depth thresholds.

2. The method of claim 1, further comprising:
    applying a first shading rate to a first screen region among the one or more screen regions determined to be lower than a first threshold in the one or more depth thresholds; and
    applying a second shading rate to a second screen region among the one or more screen regions determined to be higher than the first threshold in the one or more depth thresholds.

3. The method of claim 1, further comprising:
    rendering a first object in a first screen region among the one or more screen regions using a first shading rate among the one or more shading rates; and
    rendering a second object in a second screen region among the one or more screen regions using a second shading rate among the one or more shading rates.

4. The method of claim 1, the calculating the one or more depth thresholds further comprising:
    performing image processing to analyze one or more characteristics of depth in the depth buffer; and
    calculating the one or more depth thresholds based on the one or more characteristics of depth.

5. The method of claim 1, the controlling the shading rate further comprising:
    building an additional graphic command based on the one or more shading rates to configure a vertex shader; and
    inserting the additional graphic command into a command buffer.

6. The method of claim 1, the controlling the shading rate further comprising:
    building a variable rate shading lookup image comprising one or more pixel values; and
    inserting an additional graphic command into a command buffer that references the variable rate shading lookup image.

7. The method of claim 1, further comprising:
    dividing the computer graphic into at least one sample frame and at least one normal frame;
    for the at least one sample frame:
        calculating the one or more depth thresholds and one or more strides corresponding to the one or more depth thresholds; and
        applying the one or more shading rates to the one or more screen regions based on the one or more depth thresholds;
    for the at least one normal frame:
        calculating one or more updated depth thresholds by adding the one or more strides to the one or more depth thresholds; and
        applying one or more updated shading rates to one or more updated screen regions based on the one or more updated depth thresholds.

8. The method of claim 7, the calculating the one or more strides further comprising:
extrapolating the one or more depth thresholds of the at least one sample frame and one or more previous depth thresholds of at least one previous frame.

9. The method of claim 1, wherein the method is applied on a graphics driver installed on the client device, in a firmware layer between hardware and a driver, in a software layer between a software driver and an application, or in hardware on the client device.

10. The method of claim 1, wherein the at least one graphic command calls a primitive-based variable rate shading application programming interface or an image-based variable rate shading application programming interface.

11. A system for reducing graphics processing unit load by programmatically controlling shading rates in computer graphics, comprising:
a memory; and
at least one processor coupled to the memory and configured to:
process at a client device at least one graphic command to present a first frame of a computer graphic;
calculate one or more depth thresholds by analyzing a spatial distribution of depth in a depth buffer associated with the first frame; and
control a shading rate for a second frame of the computer graphic by applying one or more shading rates to one or more screen regions of the second frame based on the one or more depth thresholds.

12. The system of claim 11, the at least one processor further configured to:
apply a first shading rate to a first screen region among the one or more screen regions determined to be lower than a first threshold in the one or more depth thresholds; and
assign a second shading rate to second screen region among the one or more screen regions determined to be higher than the first threshold in the one or more depth thresholds.

13. The system of claim 11, the at least one processor further configured to:
render a first object in a first screen region among the one or more screen regions using a first shading rate among the one or more shading rates; and
render a second object in a second screen region among the one or more screen regions using a second shading rate among the one or more shading rates.

14. The system of claim 11, wherein the control of the shading rate is conducted by a graphics driver installed on the client device, in a firmware layer between hardware and a driver, in a software layer between a software driver and an application, or in hardware on the client device.

15. The system of claim 11, wherein to control the shading rate, the at least one processor is further configured to:
insert an additional graphic command into a command buffer to configure a vertex shader, wherein the additional graphic command can reference a variable rate shading lookup image.

16. The system of claim 11, wherein to calculate the one or more depth thresholds, the at least one processor is further configured to:
perform image processing to analyze one or more characteristics of depth in the depth buffer; and
calculate the one or more depth thresholds based on the one or more characteristics of depth.

17. The system of claim 11, the at least one processor further configured to:
divide the computer graphic into at least one sample frame and at least one normal frame;
for the at least one sample frame:
calculate the one or more depth thresholds and one or more strides corresponding to the one or more depth thresholds; and
apply the one or more shading rates to the one or more screen regions based on the one or more depth thresholds;
for the at least one normal frame:
calculate one or more updated depth thresholds by adding the one or more strides to the one or more depth thresholds; and
apply one or more updated shading rates to one or more updated screen regions based on the one or more updated depth thresholds.

18. The system of claim 17, wherein to calculate the one or more strides, the at least one processor is further configured to:
extrapolate the one or more depth thresholds of the at least one sample frame and one or more previous depth thresholds of at least one previous frame.

19. The system of claim 11, wherein the at least one graphic command calls a primitive-based variable rate shading application programming interface or an image-based variable rate shading application programming interface.

20. A non-transitory computer-readable device having instructions stored thereon that, when executed by at least one computing device, cause the at least one computing device to perform operations for reducing graphics processing unit load by programmatically controlling shading rates in computer graphics, the operations comprising:
processing at a client device at least one graphic command to present a first frame of a computer graphic;
calculating one or more depth thresholds by analyzing a spatial distribution of depth in a depth buffer associated with the first frame; and
controlling a shading rate for a second frame of the computer graphic by applying one or more shading rates to one or more screen regions of the second frame based on the one or more depth thresholds.

* * * * *